(12) United States Patent
Ohta

(10) Patent No.: US 9,328,792 B2
(45) Date of Patent: May 3, 2016

(54) HYDRAULIC SHOCK ABSORBER

(71) Applicant: Showa Corporation, Gyoda-shi (JP)

(72) Inventor: Masatoshi Ohta, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/605,016

(22) Filed: Jan. 26, 2015

(65) Prior Publication Data

US 2015/0276003 A1 Oct. 1, 2015

(30) Foreign Application Priority Data

Mar. 25, 2014 (JP) .................. 2014-062773

(51) Int. Cl.
*F16F 9/00* (2006.01)
*F16F 9/44* (2006.01)
*F16F 9/34* (2006.01)

(52) U.S. Cl.
CPC .................. *F16F 9/44* (2013.01); *F16F 9/3405* (2013.01)

(58) Field of Classification Search
CPC ............ F16F 9/44; F16F 9/3405; F16F 9/462
USPC ................ 188/317, 266.2, 266.3, 26.4, 266.5
See application file for complete search history.

(56) References Cited

U.S. PATENT DOCUMENTS

| | | | | |
|---|---|---|---|---|
| 4,313,529 A | * | 2/1982 | Kato .................. | F16F 9/467 188/266.4 |
| 4,463,839 A | * | 8/1984 | Ashiba .................. | F16F 9/462 188/282.4 |
| 4,591,186 A | * | 5/1986 | Ashiba .................. | F16F 9/468 188/266.4 |
| 4,592,540 A | * | 6/1986 | Yokoya .................. | B60G 17/04 188/319.1 |
| 4,596,320 A | * | 6/1986 | Shimokura ............. | F16F 9/462 188/266.4 |
| 4,635,906 A | * | 1/1987 | Buma ................ | B60G 17/0485 188/266.4 |
| 4,645,042 A | * | 2/1987 | Inoue .................. | F16F 9/462 188/282.4 |
| 4,653,735 A | * | 3/1987 | Buma .................. | F16F 9/466 188/266.1 |
| 4,666,180 A | * | 5/1987 | Shirakuma ............. | F16F 9/462 188/266.8 |
| 4,673,171 A | * | 6/1987 | Buma .................. | B60G 11/30 188/266.3 |
| 4,773,635 A | * | 9/1988 | Buma .................. | F16F 13/26 188/266.4 |
| 2014/0124314 A1 | | 5/2014 | Mochizuki et al. | |

FOREIGN PATENT DOCUMENTS

| | | | |
|---|---|---|---|
| EP | 1 876 090 A1 | 1/2008 | |
| GB | 2209375 A * | 5/1989 | ............ F16F 9/467 |
| JP | 2008-014431 A | 1/2008 | |
| JP | 2013-007408 A | 1/2013 | |

* cited by examiner

*Primary Examiner* — Thomas J Williams
*Assistant Examiner* — Mariano Sy
(74) *Attorney, Agent, or Firm* — Leason Ellis LLP

(57) ABSTRACT

A hydraulic shock absorber includes a damping force generation unit and a damping force adjustment unit. The damping force adjustment unit includes a push rod that changes an opening area of an oil path formed in a piston rod, an electric motor functioning as a driving source, and a feed screw mechanism that converts rotation of the electric motor into linear movement of the push rod. The feed screw mechanism includes a first slider that is screwed to an output shaft of the electric motor in an advanceable/retractable manner, a second slider is fitted movably to the first slider, and a set spring that pushes the second slider against one end of the push rod.

6 Claims, 5 Drawing Sheets

HYDRAULIC SHOCK ABSORBER

CROSS-REFERENCE TO RELATED APPLICATIONS

This application is based on and claims priority under 35 USC 119 from Japanese Patent Application No. 2014-062773 filed on Mar. 25, 2014, the entire content of which is incorporated herein by reference.

BACKGROUND OF THE INVENTION

1. Technical Field

The present invention relates to a hydraulic shock absorber with a damping force adjustment unit.

2. Related Art

For instance, there are hydraulic shock absorbers provided in a motorcycle to suspend a rear wheel of the motorcycle in relation to a vehicle body which have a configuration in which a cylinder is mounted on one of a vehicle body side and an axle side, a piston rod is mounted on the other side, the piston rod is partially inserted in the cylinder, a piston fixed to an end portion of the piston rod that faces an inside of the cylinder is brought into sliding contact with an inner circumference of the cylinder in a slidable manner, and a suspension spring is interposed between the cylinder and the piston.

In these hydraulic shock absorbers, some have a damping force generation unit for generating damping force by utilizing flow of oil in the cylinder that is caused when the piston rod moves in and out of the cylinder, and a damping force adjustment unit for adjusting the damping force (see, for example, Patent Literature 1 (JP-A-2008-014431)). A comparative hydraulic shock absorber with the damping force adjustment unit is described hereinafter with reference to FIG. 7.

FIG. 7 is a vertical cross-sectional view of the comparative hydraulic shock absorber provided with the damping force adjustment unit. In the hydraulic shock absorber 101 in the view, part of a piston rod 103 mounted on an axle side is inserted from below into a cylinder 102 mounted on a vehicle body side, wherein a piston 112 is fixed to a tip end of the piston rod 103 that faces an inside of the cylinder 102, and is brought into sliding contact with an inner circumference of the cylinder 102 in a vertically slidable manner, and a suspension spring, not shown, is interposed between the cylinder 102 and the piston rod 103. Note that the inside of the cylinder 102 is divided by the piston 112 into an upper chamber S1 and a lower chamber S2 which are filled with oil, the working fluid.

The piston 112 is provided with an extension side damping valve 119 and a compression side damping valve 120 which configure the damping force generation unit, and the damping force adjustment unit is provided inside the piston rod 102. The damping force adjustment unit has the following configuration.

In other words, the damping force adjustment unit is configured by a push rod 133 inserted in the hollow piston rod 103 so as to be able to move up and down, an electric motor (stepping motor) 134 which is a driving source, and a feed screw mechanism 135 for converting rotation of an output shaft 134a of the electric motor 134 into linear movement (up-and-down movement) of the push rod 133, and an oil path 136 is formed in an upper end portion of the piston rod 103, between the piston rod 103 and the push rod 133. A ring-shaped seating member 141 is attached to an upper end opening of the piston rod 103, and a side hole 137 in the piston rod 103, immediately below the piston 112. The lower chamber S2 and the oil path 136 are communicated with each other by this side hole 137.

Thus, for example, during an extension stroke in which the piston rod 103 moves downward along with the piston 112 with respect to the cylinder 102, the oil in the lower chamber S2 of the cylinder 102 is compressed by the piston 112, increasing its pressure. Consequently, the oil in the lower chamber S2 pushes the extension side damping valve 119 of the piston 112 open to flow into the upper chamber S1, resulting in generation of damping force in the hydraulic shock absorber 101 due to a resultant flow resistance of the oil. In addition, some of the oil in the lower chamber S2 flows from the side hole 137 of the piston rod 103 to the oil path 136, and then into the upper chamber S1 through the seating member 141, resulting in generation of damping force in the hydraulic shock absorber 101 due to the resultant flow resistance of the oil. This damping force is adjusted by moving the push rod 131 up and down by means of the electric motor 134 and the feed screw mechanism 135 so as to change an opening area of the seating member 141. Specifically, pushing the push rod 133 upward leads to reduction in the opening area of the seating member 141, increasing a flow resistance of the oil passing through the seating member 141. As a result, the generated damping force is adjusted high. On the other hand, moving the push rod 133 downward leads to expansion of the opening area of the seating member 141, reducing the flow resistance of the oil passing through the seating member 141. As a result, the generated damping force is adjusted low.

One of the problems with this hydraulic shock absorber 101 having such damping force adjustment unit is that downward reaction force (a direction of an arrow in the view), generated by a pressure of the oil, acts on the push rod 133 and then on the electric motor 134 via the feed screw mechanism 135, and when the reaction force acting on the push rod 133 becomes extremely strong due to an increased speed of the piston, such reaction force exceeds thrust of the electric motor 134, causing desynchronization in the electric motor 134 and interfering normal adjustment of the damping force.

In this regard, Patent Literature 2 (JP-A-2013-007408) proposes a hydraulic shock absorber in which is defined a desynchronization section where desynchronization in the stepping motor is likely to occur if the push rod (a valve body) is moved farther toward the seating member (a valve seat), wherein, in the desynchronization section, the stepping motor is energized so as to move the push rod more than twice the distance to the seating position.

SUMMARY OF THE INVENTION

Unfortunately, there is a problem with the hydraulic shock absorber proposed in Patent Literature 2 that defining the desynchronization section is difficult because it varies with each product, controlling an amount of electricity supplied to the stepping motor and a time for energizing the stepping motor is therefore complex.

In view of above, an illustrative aspect of the present invention is to provide a hydraulic shock absorber of a simple structure that is capable of preventing the occurrence of desynchronization in its electric motor and stably adjusting the damping force.

[1] An aspect of the present invention provides a hydraulic shock absorber including: a cylinder; a piston rod that is partially inserted into the cylinder; a piston that is fixed to an end portion of the piston rod facing the inside of the cylinder and is brought into sliding contact with an inner circumference of the cylinder; a damping force generation unit; and a damping force adjustment unit, in which the damping force adjustment unit includes: a push rod that changes an opening area of an oil path formed in the piston rod; an electric motor functioning as a driving source; and a feed screw mechanism that converts rotation of the electric motor into linear movement of the push rod, and in which the feed screw mechanism includes: a first slider that is screwed to an output shaft of the electric motor in an advanceable/retractable manner; a second slider is fitted movably to the first slider; and a set spring that pushes the second slider against one end of the push rod.

[2] The hydraulic shock absorber of [1] may have a configuration in which, the damping force adjustment unit further includes a stopper that comes into abutment with the second slider to stop the second slider from moving.

[3] The hydraulic shock absorber of [1] or [2] may have a configuration in which, a maximum set load of the set spring is set at a value equal to or lower than a thrust of the electric motor.

[4] The hydraulic shock absorber of [3] may have a configuration in which, force acting on the output shaft of the electric motor is kept equal to or lower than a withstand load of the electric motor by bringing the second slider into abutment with the stopper in response to reaction force acting on the push rod exceeding a preset load of the set spring.

With the configuration of [1], when the reaction force acting on the push rod exceeds the thrust of the electric motor, the second slider slides with respect to the first slider against the biasing force of the set spring, and, because no reaction force equal to or greater than the thrust of the electric motor acts on the electric motor, desynchronization of the electric motor is prevented from occurring. As a result, the damping force can be adjusted stably, and damage to the electric motor and the feed screw mechanism is prevented.

With the configuration of [2], even when the second slider moves due to excessive reaction force acting on the push rod, the second slider is brought into abutment with the stopper and consequently prevented from sliding any farther. Consequently, the stopper receives some of the excessive reaction force so that the excessive reaction force does not act directly on the electric motor, reliably preventing the occurrence of desynchronization in the electric motor, as well as damage to the electric motor.

With the configuration of [3], the maximum set load of the set spring is set at a value equal to or lower than the thrust of the electric motor. Therefore, when reaction force greater than the thrust of the electric motor acts on the push rod, the second slider moves against the biasing force of the set spring, so only reaction force equal to or lower than the maximum set load of the set spring acts on the electric motor, reliably preventing the occurrence of desynchronization of the electric motor.

With the configuration of [4], the force acting on the output shaft of the electric motor is kept equal to or lower than the withstand load of the electric motor by bringing the second slider into abutment with the stopper when the reaction force acting on the push rod exceeds the preset load of the set spring. This reliably prevents the damage to the electric motor and the feed screw mechanism.

DETAILED DESCRIPTION OF THE INVENTION

DESCRIPTION OF EMBODIMENTS

An embodiment of the present invention is described hereinafter with reference to accompanying drawings.

[Configuration of Hydraulic Shock Absorber]

Figure 1:
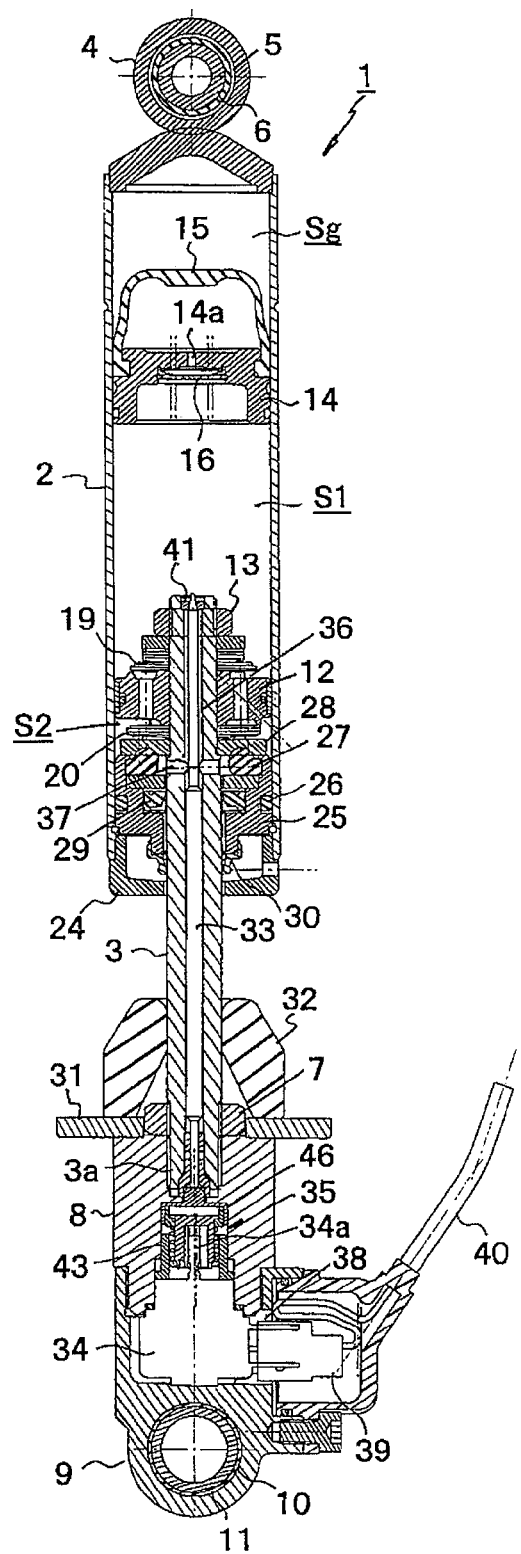
FIG. 1 is a vertical cross-sectional view of a hydraulic shock absorber according to the present invention.
Figure 2:
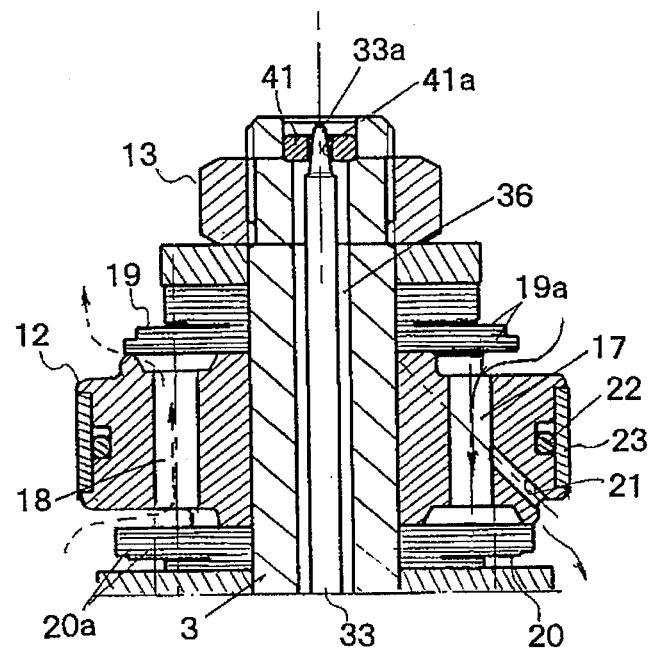
FIG. 2 is an enlarged detail view of a piston portion shown in FIG. 1.
Figure 3:
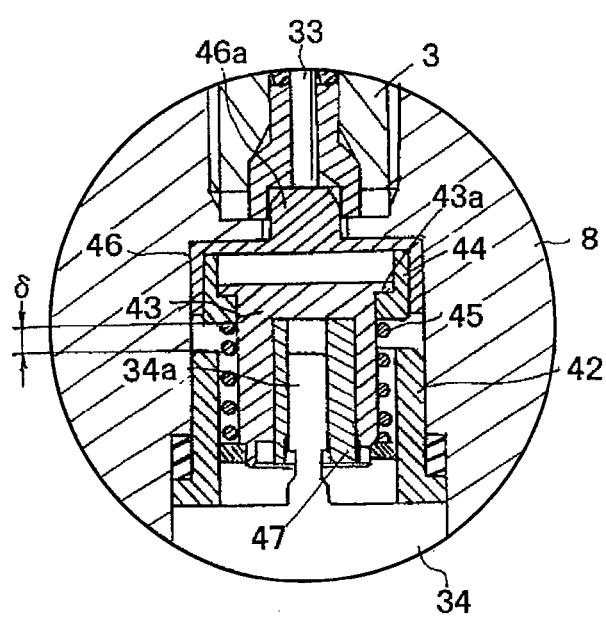
FIG. 3 is an enlarged detail view of a feed screw mechanism portion shown in FIG. 1.
Figure 4:
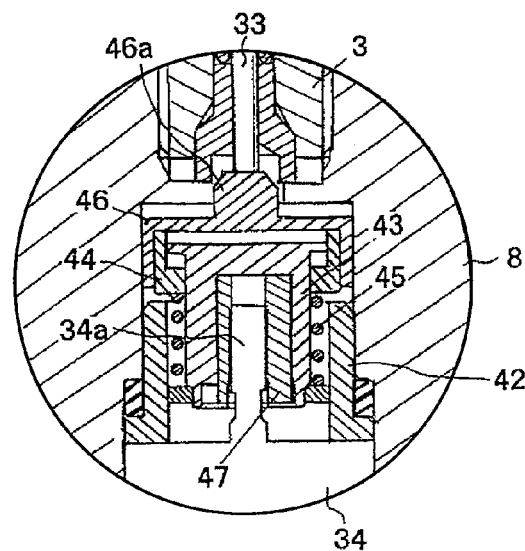
FIG. 4 is a view same as FIG. 3, showing a state in which a second slider of a damping force adjustment unit of the hydraulic shock absorber according to the present invention slides.
Figure 5:
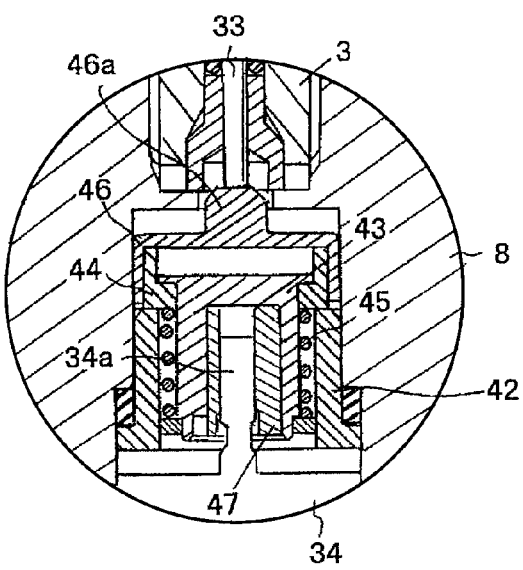
FIG. 5 is a view same as FIG. 3, showing a state in which the second slider of the damping force adjustment unit of the hydraulic shock absorber according to the present invention comes into abutment with a stopper via a spring guide.

FIG. 1 is a vertical cross-sectional view of a hydraulic shock absorber according to the present invention. FIG. 2 is an enlarged detail view of a piston portion shown in FIG. 1. FIG. 3 is an enlarged detail view of a feed screw mechanism portion shown in FIG. 1. FIG. 4 is a view same as FIG. 3, showing a state in which a second slider of a damping force adjustment unit slides. FIG. 5 is a view same as FIG. 3, showing a state in which the second slider of the damping force adjustment unit comes into abutment with a stopper via a spring guide.

The hydraulic shock absorber 1 according to the present embodiment is an inverted rear cushion that suspends a rear wheel of a motorcycle, not shown, with respect to a vehicle body, and is configured by inserting, from below, part of a hollow piston rod 3 on an axle side into a cylinder 2 on a vehicle body side and interposing a suspension spring, not shown, between the cylinder 2 and the piston rod 3.

As shown in FIG. 1, a vehicle body-side attachment member 4 is fixed to an upper end portion of the cylinder 2, and a cylindrical rubber bush 5 is inserted through and held by the vehicle body-side attachment member 4 in a horizontal direction (a direction perpendicular to the page space of FIG. 1). Also, a cylindrical collar 6 is inserted through and held by an inside of the cylindrical rubber bush 5 in the horizontal direction. The upper end portion of the cylinder 2 is mounted on the vehicle body of the motorcycle by a shaft, not shown, that is inserted through the collar 6 that is inserted through and held by the vehicle body-side attachment member 4.

A locknut 7 and a collar 8 are screwed to a screw portion 3a that is formed in a lower end portion of the piston rod 3. An axle-side attachment member 9 is screwed to the outer circumference of a lower end portion of the collar 8. A cylindrical rubber bush 10 is inserted through and held by the axle-side attachment member 9 in the horizontal direction, and a cylindrical collar 11 is inserted through and held by the inside of the rubber bush 10 in the horizontal direction. The lower end portion of the piston rod 3 is mounted in a rear wheel support member of the motorcycle by an axle, not shown, that is inserted through the collar 11 that is inserted through and held by the axle-side attachment member 9.

Incidentally, a piston 12 is fixed to an upper end portion of the piston rod 3 facing the inside of the cylinder 2 by a nut 13, and this piston 12 is fitted in a vertically slidable manner into an inner circumference of the cylinder 2.

As shown in FIG. 1, a bottomed, tubular partition wall member 14 that is opened downward is fitted to an upper part of the cylinder 2, and a bladder 15 that is formed into a pouch with an elastic member such as rubber and is capable of expanding/contracting is placed to cover an upper outer circumference of the partition wall member 14. A space above the bladder 15 in the cylinder 2 configures a gas chamber Sg, in which high-pressure gas is encapsulated. An oil hole 14a is formed in a center part of the partition wall member 14, and a check valve device 16 is incorporated therein.

Thus, a space in the cylinder 2 that is defined by the partition wall member 14 is divided into an upper chamber S1 and a lower chamber S2 by the piston 12 fitted into the inner circumference of the cylinder 2, and these upper and lower chambers S1 and S2 are filed with oil, the working fluid. As shown in detail in FIG. 2, the piston 12 is provided with a plurality of compression side and extension side oil paths 17 and 18 (FIG. 2 shows one of each) that pass through the piston 12 in the vertical direction, and an extension side damping valve 19 for selectively opening/closing the extension side oil paths 18 is provided on an upper surface side of the piston 12. The extension side oil paths 18 are opened to the lower chamber S2 at all times. Note that the extension side damping valve 19 is formed by stacking a plurality of flexible, thin sheet valves 19a.

Moreover, a compression side damping valve 20 for selectively opening/closing the compression side oil paths 17 is provided on a lower surface side of the piston 12. As with the extension side damping valve 19, the compression side damping valve 20 is formed by stacking a plurality of flexible, thin sheet valves 20a. The compression side oil paths 17 are opened to the upper chamber S1 at all times. A small-diameter bypass 21 that communicates the upper chamber S1 and the lower chamber S2 to each other at all times is formed in the piston 12. Note that the piston 12 is fitted in a vertically slidable manner into the inner circumference of the cylinder 2 via a piston ring 23 that is elastically supported on an outer circumference of the piston 12 via an elastic ring 22.

Thus, the extension side damping valve 19 and the compression side damping valve 20 configure a damping force generation unit for generating extension side damping force and compression side damping force respectively, and therefore generate the extension side damping force and the compression side damping force during a compression stroke and an extension stroke respectively.

On the other hand, as shown in FIG. 1, a part of a lower surface opening of the cylinder 2 through which the piston rod 3 is inserted is covered with a cap 24. A rod guide 25 through which the piston rod 3 passes at a center thereof is fitted to an inner circumference of a lower end portion of the cylinder 2 via a seal ring 26 such as an O-ring. This rod guide 25 holds a rebound rubber 27, a stopper ring 28, an oil seal 29, and a dust seal 30 sequentially from the top. A sealing effect of the oil seal 29 and dust seal 30 prevents leakage of oil from the cylinder 2 and dust from entering the cylinder 2.

A ring-shaped lower spring bearing 31 is fitted to and held by an outer circumference of the locknut 7 that is screwed to the screw portion 3a formed in the lower end portion of the piston rod 3. The suspension spring, not shown, is interposed between this lower spring bearing 31 and an upper spring bearing, not shown, which is fitted to an upper circumference of the cylinder 2. Note that a bump rubber 32 is fixedly attached to an upper surface of the lower spring bearing 31.

Incidentally, the hydraulic shock absorber 1 according to the present embodiment is provided with a damping force adjustment unit. In other words, as shown in FIG. 1, this damping force adjustment unit is configured by a push rod 33 that is inserted in a vertically movable manner through the hollow piston rod 3, a stepping motor 34, which is a driving source embedded in the axle-side attachment member 9 and the collar 8, and a feed screw mechanism 35 that converts rotation of an output shaft 34a of the stepping motor 34 into vertical movement of the push rod 33.

An upper half of the push rod 33 has a small diameter, around which a cylindrical flow path 36 is formed. A side hole 37 is formed immediately below the piston 12 on the piston rod 3. The flow path 36 is communicated to the lower chamber S2 via the side hole 37. Note that the stepping motor 34 is connected to an unshown power source of a controller or the like by an electrical cord 40 that extends from a connector 39 connected to a coupler 38.

Moreover, as shown in detail in FIG. 2, a tip end portion (upper end portion) of the push rod 33 configures a sharp needle portion 33a pointed upward. This needle portion 33a passes through a circular hole 41a that is formed in a center of a ring-shaped seating member 41 fitted to an inner circumference of an upper end of the piston rod 3, and the circular hole 41 a is opened to the upper chamber S1.

In the present embodiment, therefore, the feed screw mechanism 35 provided in the damping force adjustment unit is configured as follows.

Specifically, as shown in detail in FIG. 3, a cylindrical stopper 42 is fitted to a circumference of the output shaft 34a of the stepping motor 34 that is provided on an inner circumference of the collar 8. On an inside of the stopper 42, an eccentric collar 47 is eccentrically positioned in a first cylindrical slider 43 configuring the feed screw mechanism 35. The eccentric collar 47 is screwed to the output shaft 34a of the stepping motor 34 in an advanceable/retractable manner, wherein an outer circumference of the eccentric collar 47 is decentered with respect to the output shaft 34a of the stepping motor 34. The eccentric collar 47, positioned eccentrically to prevent from rotation, moves up and down together with the first slider 43 as the output shaft 34a of the stepping motor 34 rotates.

A cylindrical spring guide 44 is fitted in a vertically slidable manner to an outer circumference of the first slider 43. This spring guide 44 is biased upward by a set spring 45 that is compressed and mounted on the outer circumference of the first slider 43. Note that the spring guide 44 is prevented from falling out of the first slider 43 by a flange portion 43a that is formed integrally on an outer circumference of an upper end of the first slider 43.

Figure 6:
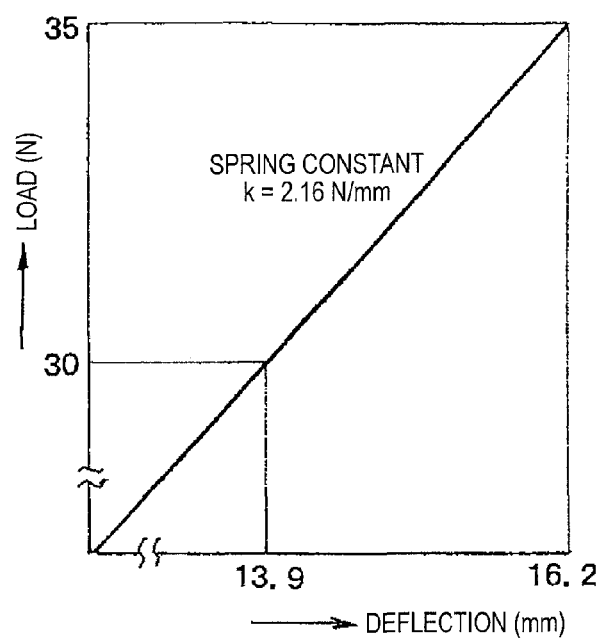
FIG. 6 is a diagram showing relationship between an amount of a deflection and a load of a set spring of the hydraulic shock absorber according to the present invention.
Figure 7:
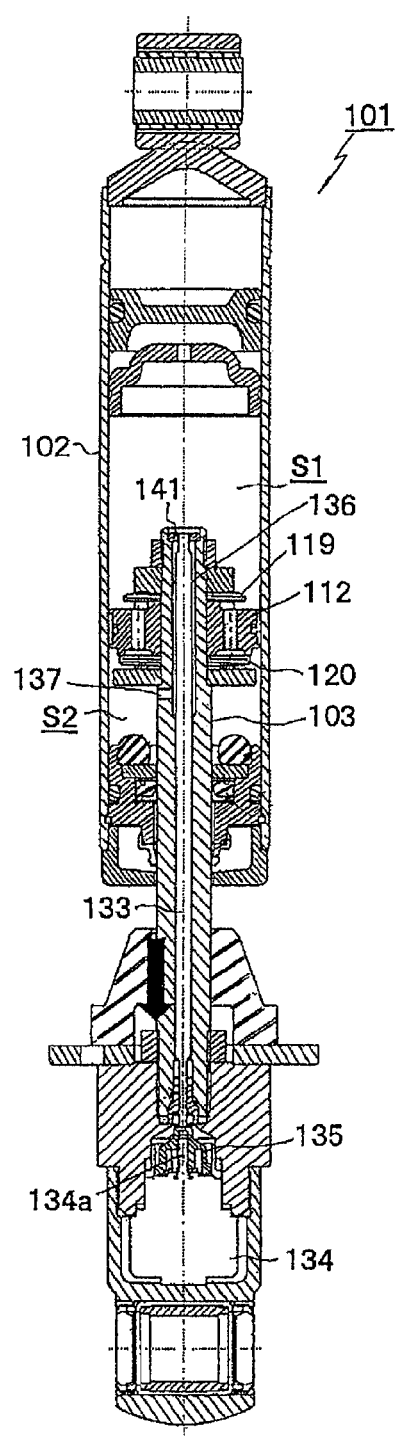
FIG. 7 is a vertical cross-sectional view of a comparative hydraulic shock absorber provided with a damping force adjustment unit.

Furthermore, a bottomed, tubular second slider 46 is fixedly attached to an outer circumference of the spring guide 44. The second slider 46 is fitted so as to be able to slide integrally with the spring guide 44 with respect to the first slider 43. A cylindrical pressing portion 46a, provided in a projecting manner in an upper end central portion of the second slider 46, is in constant abutment with a lower end surface of the push rod 33 that is subjected to downward reaction force by a pressure of the oil. Characteristics of the set spring 45 (a relationship between a deflection and a load) are shown in FIG. 6, wherein the set spring 45 has a spring constant k of 2.16 N/mm and a preset load thereof is set at 30 N. Note that the preset load of the set spring 45, 30 N, is merely an example; thus, the preset load is not limited to this value.

Therefore, in a case where the reaction force acting on the push rod 33 is equal to or lower than the preset load (30 N) of the set spring 45, the second slider 46 and the push rod 33 are biased upward via the spring guide 44 without having the set spring 45 deflexed, as shown in FIG. 3. In this state, while the spring guide 44 is placed in an upper limit position where the spring guide 44 comes into abutment with the flange portion 43a of the first slider 43, the second slider 46 is pressed upward by the spring guide 44. A gap δ extending in the vertical direction is formed between the spring guide 44 and the stopper 42.

[Operation of Hydraulic Shock Absorber]

Operation of the hydraulic shock absorber 1 configured as described above in the compression stroke and the extension stroke is described hereinafter.

1) Compression Stroke:

When the rear wheel of the motorcycle moves up and down on an uneven surface of a road, the cylinder 2 and piston rod 3 of the hydraulic shock absorber 1 suspending the rear wheel move telescopically. During the compression stroke in which the piston rod 3 moves upward relatively to the cylinder 2, the oil in the upper chamber S1 is compressed by the piston 12, increasing the pressure thereof. Some of the oil passes through the compression side oil path 17 of the piston 12 and pushes the compression side damping valve 20 open, to flow into the lower chamber S2, as shown by the solid arrow in FIG. 2. At this moment, necessary compression side damping force is generated in the hydraulic shock absorber 1 by a flow resistance that results when the oil passes through the compression side damping valve 20. Note that some of the oil passing through the compression side oil path 17 of the piston 12 bypasses the compression side damping valve 20 and flows directly from the bypass 21 into the lower chamber S2.

In addition, during the compression stroke, part of the oil in the upper chamber S1 flows from the circular hole 41a of the seating member 41 to the oil path 36 of the piston rod 3, the seating member 41 being fitted to an inner circumference of the upper end portion of the piston rod 3, and then flows from the oil path 36 into the lower chamber S2 through the side hole 37 of the piston rod 3. Consequently, damping force is generated in the hydraulic shock absorber 1 by a flow resistance that results when the oil passes through the circular hole 41a of the seating member 41. This damping force is adjusted by changing an opening area of the circular hole 41a of the seating member 41 by moving the push rod 33 up and down.

In other words, when the stepping motor 34 is driven, the rotation of its output shaft 34a is converted into vertical movement of the feed screw mechanism 35. At this moment, when the downward reaction force acting on the push rod 33 is equal to or lower than the preset load (30 N) of the set spring 45, the spring guide 44 that is biased upward by the set spring 45 comes into abutment with the flange portion 43a of the first slider 43 and moves and up and down together with the first slider 43 as shown in FIG. 3. As a result of this vertical movement, the second slider 46 and the push rod 33 are also moved up and down integrally. Then, the opening area of the circular hole 41a of the seating member 41 is changed by the vertical movement of the push rod 33, whereby the damping force is adjusted. Specifically, the upward movement of the push rod 33 causes the needle portion 33a in the tip end of the push rod 33 to reduce the opening area of the circular hole 41a of the seating member 41, increasing the flow resistance of the oil passing through the circular hole 41a, and adjusting the damping force high. When the push rod 33 is moved downward by rotating the stepping motor 34 in a reverse direction, the opening area of the circular hole 41a of the seating member 41 is increased, reducing the flow resistance of the oil passing through the circular hole 41a, and adjusting the damping force low.

Thus, when strong reaction force equal to or greater than the preset load (30 N) of the set spring 45 acts on the push rod 33 due to a traveling condition of the motorcycle, the second slider 46 and the spring guide 44 move downward along the first slider 43 while pushing and compressing the set spring 45, as shown in FIG. 4.

In a case where excessive reaction fore exceeding the maximum set load (35 N) of the set spring 45 acts on the push rod 33, the spring guide 44 comes into abutment with the stopper 42, reducing the gap δ therebetween to 0, as shown in FIG. 5. Consequently, the excessive force is received by the stopper 42. In the present embodiment, force that acts on the first slider 43 and the output shaft 34a of the stepping motor 34 is kept equal to or lower than 35 N, which is lower than the withstand load of the stepping motor 34. This prevents the first slider 43 and the output shaft 34a of the stepping motor 34 from being subjected to strong force equal to or greater than the maximum set load (35 N) of the set spring 45, preventing desynchronization of the stepping motor 34 and resulting in stable adjustment of the damping force. Consequently, the output shaft 34a of the stepping motor 34 is subjected to force equal to or lower than the withstand load of the stepping motor 34 as described above, damage to the stepping motor 34 and the feed screw mechanism 35 can reliably be prevented.

Also during the compression stroke, an amount of oil equal to a volume of part of the piston rod 3 entering the cylinder 2 flows to the check valve device 16 provided in the partition wall member 14, and flows from the oil hole 14a into the bladder 15 through the check valve device 16, expanding the bladder 15. This expansion of the bladder 15 compensates for a change in volume of the upper chamber S1 which is caused by the part of the piston rod 3 entering the cylinder 2.

2) Extension Stroke:

During the extension stroke in which the piston rod 3 moves downward relatively to the cylinder 2, the piston 12 moves downward in the cylinder 2 along with the piston rod 3. Consequently, the oil in the lower chamber S2 is compressed by the piston 12, increasing the pressure thereof. Some of the oil in the lower chamber S2 passes through the extension side oil path 18 of the piston 12 and pushes the extension side damping valve 19 open, to flow into the upper chamber S1, as shown by the dashed arrow in FIG. 2. At this moment, necessary extension side damping force is generated in the hydraulic shock absorber 1 by a flow resistance that results when the oil passes through the extension side damping valve 19. Note that some of the oil in the lower chamber S2 flows into the upper chamber S1 through the bypass 21 of the piston 12 and the compression side oil path 17.

In addition, during the extension stroke, part of the oil in the lower chamber S2 flows from the side hole 37 of the piston rod 3 to the oil path 36 between the piston rod 3 and the push rod 33, and then flows into the upper chamber S1 through the circular hole 41a of the seating member 41. Consequently, damping force is generated in the hydraulic shock absorber 1 by the flow resistance that results when the oil passes through the circular hole 41a of the seating member 41. This damping force is adjusted by changing the opening area of the circular hole 41a of the seating member 41 by moving the push rod 33 up and down. In this case as well, when the strong reaction force acts on the push rod 33, the second slider 46 and the spring guide 44 slide along the first slider 43 against the biasing force of the set spring 45, as with the situation described above. This prevents the output shaft 34a of the stepping motor 34 from being subjected to force equal to or greater than the withstand load of the stepping motor 34, preventing desynchronization of the stepping motor 34 and resulting in stable adjustment of the damping force. Furthermore, the damage to the stepping motor 34 and the feed screw mechanism 35 can reliably be prevented.

Also, during the extension stroke, an amount of oil equal to a volume of part of the piston rod 3 outgoing from the cylinder 2 flows from the bladder 15 to fill the upper chamber S1. In other words, the oil in the bladder 15 flows through the check valve device 16 embedded in the partition wall member 14, to fill the upper chamber S1. As a result, the bladder 15 contracts, and this contraction of the bladder 15 compensates for the change in the volume of the upper chamber S1 which is caused by the piston rod 3 outgoing from the cylinder 2.

In the hydraulic shock absorber 1 according to the present embodiment, as described above, when the reaction force acting on the push rod 33 exceeds the preset load (30 N) of the set spring 45, the second slider 46 and the spring guide 44 slide with respect to the first slider 43 against the biasing force of the set spring 45. This prevents the stepping motor 34 from being subjected to the reaction force equal to or greater than the withstand load (the maximum thrust) of the stepping motor 34, preventing desynchronization of the stepping motor 34 and resulting in stable adjustment of the damping force. Furthermore, the damage to the stepping motor 34 and the feed screw mechanism 35 can reliably be prevented. Note that the preset load of the set spring 45 is set at the value equal to or lower than thrust of the stepping motor 34 (30 N, in the present embodiment). Accordingly, when a reaction force exceeding the thrust of the stepping motor 34 acts on the push rod 33, the second slider 46 moves against the biasing force of the set spring 45. Consequently, the reaction force equal to or lower than the maximum set load (35 N) of the set spring 45 to act on the stepping motor 34, reliably preventing the occurrence of desynchronization in the stepping motor 34.

In the hydraulic shock absorber 1 according to the present embodiment, even in a case where the second slider 46 moves together with the spring guide 44 along the first slider 43 due to an excessive reaction force acting on the push rod 33, the spring guide 44 is brought into abutment with the stopper 42 as shown in FIG. 5 and prevented from sliding any farther. Consequently, some of the excessive reaction force is received by the stopper 42, and the force acting on the stepping motor 34 is kept equal to or lower than the withstand load of the stepping motor 34 (35 N or lower, in the present embodiment), reliably preventing the damage to the stepping motor 34 and the feed screw mechanism 35.

The above has described the embodiment in which the present invention is applied to the inverted hydraulic shock absorber having its cylinder mounted on the vehicle body side and piston rod on the axle side. However, the present invention can be applied to an upright hydraulic shock absorber having its piston rod mounted on the vehicle body side and its cylinder on the axle side.

The above has also described the embodiment in which the present invention is applied to the hydraulic shock absorber that is used as a rear cushion for suspending the rear wheel of the motorcycle with respect to the vehicle body. However, it goes without saying that the present invention can be applied to a hydraulic shock absorber for suspending a rear wheel of any vehicle other than the motorcycle.

What is claimed is:

1. A hydraulic shock absorber comprising:
a cylinder;
a piston rod that is partially inserted into the cylinder;
a piston that is fixed to an end portion of the piston rod facing the inside of the cylinder and is brought into sliding contact with an inner circumference of the cylinder;
a damping force generation unit; and
a damping force adjustment unit,
wherein the damping force adjustment unit comprises:
a push rod that changes an opening area of an oil path formed in the piston rod;
an electric motor functioning as a driving source; and
a feed screw mechanism that converts rotation of the electric motor into linear movement of the push rod, and
wherein the feed screw mechanism comprises:
a first slider that is screwed to an output shaft of the electric motor in an advanceable/retractable manner;
a second slider is fitted movably to the first slider; and
a set spring that pushes the second slider against one end of the push rod.

2. The hydraulic shock absorber according to claim 1, wherein the damping force adjustment unit further includes a stopper that comes into abutment with the second slider to stop the second slider from moving.

3. The hydraulic shock absorber according to claim 1, wherein a maximum set load of the set spring is set at a value equal to or lower than a thrust of the electric motor.

4. The hydraulic shock absorber according to claim 2, wherein a maximum set load of the set spring is set at a value equal to or lower than a thrust of the electric motor.

5. The hydraulic shock absorber according to claim 3, wherein force acting on the output shaft of the electric motor is kept equal to or lower than a withstand load of the electric motor by bringing the second slider into abutment with the stopper in response to reaction force acting on the push rod exceeding a preset load of the set spring.

6. The hydraulic shock absorber according to claim 4, wherein force acting on the output shaft of the electric motor is kept equal to or lower than a withstand load of the electric motor by bringing the second slider into abutment with the stopper in response to reaction force acting on the push rod exceeding a preset load of the set spring.

* * * * *